United States Patent
Zhao et al.

(10) Patent No.: US 12,363,282 B2
(45) Date of Patent: Jul. 15, 2025

(54) WARP MODE FOR INTRA PREDICTION

(71) Applicant: TENCENT AMERICA LLC, Palo Alto, CA (US)

(72) Inventors: Xin Zhao, San Jose, CA (US); Liang Zhao, Sunnyvale, CA (US); Han Gao, San Diego, CA (US); Jing Ye, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 74 days.

(21) Appl. No.: 18/497,726

(22) Filed: Oct. 30, 2023

(65) Prior Publication Data

US 2024/0275942 A1 Aug. 15, 2024

Related U.S. Application Data

(60) Provisional application No. 63/443,901, filed on Feb. 7, 2023.

(51) Int. Cl.
*H04N 19/105* (2014.01)
*H04N 19/167* (2014.01)
*H04N 19/176* (2014.01)
*H04N 19/196* (2014.01)

(52) U.S. Cl.
CPC ......... *H04N 19/105* (2014.11); *H04N 19/167* (2014.11); *H04N 19/176* (2014.11); *H04N 19/196* (2014.11)

(58) Field of Classification Search
None
See application file for complete search history.

(56) References Cited

U.S. PATENT DOCUMENTS

| | | | |
|---|---|---|---|
| 2017/0238020 A1* | 8/2017 | Karczewicz | H04N 19/80 375/240.29 |
| 2018/0176582 A1 | 6/2018 | Zhao et al. | |
| 2019/0286902 A1* | 9/2019 | Rowe | G06F 18/2451 |
| 2020/0145649 A1 | 5/2020 | Kim et al. | |
| 2020/0186830 A1 | 6/2020 | Seregin et al. | |
| 2020/0304798 A1 | 9/2020 | Zhao et al. | |
| 2022/0038702 A1* | 2/2022 | Lainema | H04N 19/61 |
| 2022/0060734 A1* | 2/2022 | Chen | H04N 19/59 |
| 2022/0141459 A1* | 5/2022 | Sarwer | H04N 19/132 375/240.02 |
| 2022/0264101 A1 | 8/2022 | Koo et al. | |
| 2023/0206518 A1* | 6/2023 | Hennebelle | G06T 7/90 382/167 |

(Continued)

OTHER PUBLICATIONS

Feng et al., "Versatile Learned Video Compression," Jan. 5, 2022.*

(Continued)

*Primary Examiner* — Michael J Hess
(74) *Attorney, Agent, or Firm* — Crowell & Moring LLP

(57) ABSTRACT

This disclosure describes a set of advanced video coding technologies and is particular related to an intra warp prediction of a sample in a video block where the sample is intra predicted using a weighted sum of basis functions of pixel coordinate position of the sample. A set of weighting coefficients for the weighted sum may be predefined or may be derived by an encoder and signaled in a bitstream containing the video block at various coding levels.

20 Claims, 11 Drawing Sheets

(56) References Cited

U.S. PATENT DOCUMENTS

2024/0171757 A1* 5/2024 Andersson ........... H04N 19/593
2024/0184213 A1* 6/2024 Hamouda ............... G03F 7/705
2024/0422345 A1* 12/2024 Yin ...................... G06N 3/0455
2025/0053106 A1* 2/2025 Goorden ............... G03F 9/7088

OTHER PUBLICATIONS

Lakshman et al., "Video Coding with Cubic Spline Interpolation and Adaptive Motion Model Selection," IEEE, 2010.*
International Search Report and Written Opinion of PCT application PCT/US23/36460, dated Mar. 5, 2024, 11 pages.

\* cited by examiner

WARP MODE FOR INTRA PREDICTION

INCORPORATION BY REFERENCE

This application is based on and claims the benefit of priority to U.S. Provisional Patent Application No. 63/443,901, entitled "Intra Warp Mode," filed on Feb. 7, 2023, which is herein incorporated by reference in its entirety.

TECHNICAL FIELD

This disclosure describes a set of advanced video coding technologies and is particular related to an intra warp prediction of a sample in a video block where the sample is intra predicted using a weighted sum of basis functions of pixel coordinate position of the sample.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques.

SUMMARY

This disclosure describes a set of advanced video coding technologies and is particular related to an intra warp prediction of a sample in a video block where the sample is intra predicted using a weighted sum of basis functions of pixel coordinate position of the sample.

In some example implementations, a method for decoding a block in a video bitstream is disclosed. The method may include determining, based on a syntax element in the video bitstream, that an intra warp prediction is applied to the block; determining a set of weighting coefficients to be applied to a set of basis functions used in the intra warp prediction; predicting a value for a sample of the block based on a weighted sum of the set of basis functions on a pixel coordinate position of the sample, wherein the set of basis functions are weighted according to the set of weighting coefficients respectively; and reconstructing the block comprising the sample based on the predicted value.

In the example implementations above, the set of basis functions comprise power functions of the pixel coordinate position of the sample up to an order of N, N being an integer; and the weighted sum of the basis functions comprises a polynomial of the pixel coordinate position of the sample of up to the order of N.

In any one of the example implementations above, N=2 and the set of weighting coefficients may include 6 coefficients for two-dimensional polynomial terms of horizontal and vertical pixel coordinates of the sample; 5 coefficients for two-dimensional polynomial terms of horizontal and vertical pixel coordinates of the sample except one cross term; or 4 coefficients for two-dimensional polynomial terms dependent on horizontal and vertical pixel coordinates of the sample except one cross term, and further comprise at least one coordinate-independent term.

In any one of the example implementations above, the at least one coordinate-independent term comprises an offset term comprising a DC value derived from reconstructed neighbors of the sample.

In any one of the example implementations above, the set of weighting coefficients further comprise an offset coefficient and the at least one coordinate-independent term comprises an offset term being a product of the offset coefficient and a reconstructed value of a top-left corner sample of the block; or the set of weighting coefficients further comprise a first offset coefficient and a second offset coefficient, and the at least one coordinate-independent term comprises a first offset term and a second offset term, the first offset term being a product of the first offset coefficient and a top reconstructed neighbor of the sample, and the second offset term being a product of the second offset coefficient and a left reconstructed neighbor of the sample; or the set of weighting coefficients further comprise a first, second, third, and fourth offset coefficients, and the at least one coordinate-independent term comprises a first, second, third, and fourth offset terms, the first offset term being a product of the first offset coefficient and a top reconstructed neighbor of the sample, the second offset term being a product of the second offset coefficient and a left reconstructed neighbor of the sample, the third offset term being a product the third offset coefficient and a top-right reconstructed neighbor of the sample, and the fourth offset term being a product of the fourth offset coefficient and a bottom left reconstructed neighbor of the sample.

In any one of the example implementations above, N=2 and the weighted sum of the basis functions may include $p(x, y)=a \cdot x^2+b \cdot y^2+c \cdot x \cdot y+d \cdot x+e \cdot y+f$; or $p(x, y)=a \cdot x^2+b \cdot y^2+d \cdot x+e \cdot y+f$, where a, b, c, d, e, and f represent polynomial coefficients, (x, y) represents the sample coordinate, and p(x, y) represents the weighted sum.

In any one of the example implementations above, the set of basis functions comprise up to N trigonometric basis functions of the pixel coordinate position of the sample, where N is an integer and wherein the N trigonometric basis functions may include first N type-2 discrete cosine transform bases; first N type-7 discrete sine transform bases; or any N type 1 through 8 discrete sine transform bases and type 1 through 8 discrete cosine transform bases.

In any one of the example implementations above, wherein the set of basis functions comprise up to N Karhunen Loeve Transform (KLT) bases as function of the pixel coordinate position of the sample, N being an integer.

In any one of the example implementations above, the N KLT bases comprise eigen vectors of a covariance matrix derived from reconstructed neighbors of the sample or are predefined eigen vectors known to both an encoder and a decoder.

In any one of the example implementations above, the set of basis functions comprise a subset of power functions and a subset of trigonometric functions of the pixel coordinate position of the sample.

In any one of the example implementations above, the method further includes parsing the video bitstream to determine the set of weighting coefficients signaled in the video bitstream.

In any one of the example implementations above, the set of weighting coefficients are derived by an encoder using multiple-line template at above and left of the block.

In any one of the example implementations above, parsing the video bitstream to determine the weighting coefficients may include parsing the video bitstream to obtain an index for the set of weighting coefficients from the video bitstream; and identifying the set of weighting confidents among a plurality of sets of weighting coefficients according to the index.

In any one of the example implementations above, the set of weighting confidents are clipped to a predefined value range.

In any one of the example implementations above, the prediction value of the sample is clipped to a predefined value range and wherein a clipped minimum value and a clipped maximum value of the prediction value are determined by an internal bit depth range.

In any one of the example implementations above, the set of weighting coefficients are quantized according to one or more predefined precisions.

In any one of the example implementations above, at least two of the set of weighting coefficients are quantized to different precisions.

In any one of the example implementations above, terms in the weighted sum of the set of basis functions associated with a same precision are calculated and rounded together.

In any one of the example implementations above, precisions for the set of weighting coefficients are signaled in high-level syntax in the video bitstream.

In some other implementations, a device for processing video information is disclosed. The device may include a circuitry configured to perform any one of the method implementations above.

Aspects of the disclosure also provide non-transitory computer-readable mediums storing instructions which when executed by a computer for video decoding and/or encoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Throughout the specification and claims, terms may have nuanced meanings suggested or implied in context beyond an explicitly stated meaning. The phrase "in one embodiment/implementation" or "in some embodiments/implementations" as used herein does not necessarily refer to the same embodiment/implementation and the phrase "in another embodiment/implementation" or "in other embodiments" as used herein does not necessarily refer to a different embodiment. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of context-dependent meanings. Typically, "or" if used to associate a list, such as A, B or C, is intended to mean A, B, and C, here used in the inclusive sense, as well as A, B or C, here used in the exclusive sense. In addition, the term "one or more", "at least one", "a", "an", or "the" as used herein, depending at least in part upon context, may be used in a singular sense or plural sense. In addition, the term "based on" or "determined by" may be understood as not necessarily intended to convey an exclusive set of factors and may, instead, allow for existence of additional factors not necessarily expressly described, again, depending at least in part on context.

Figure 1:
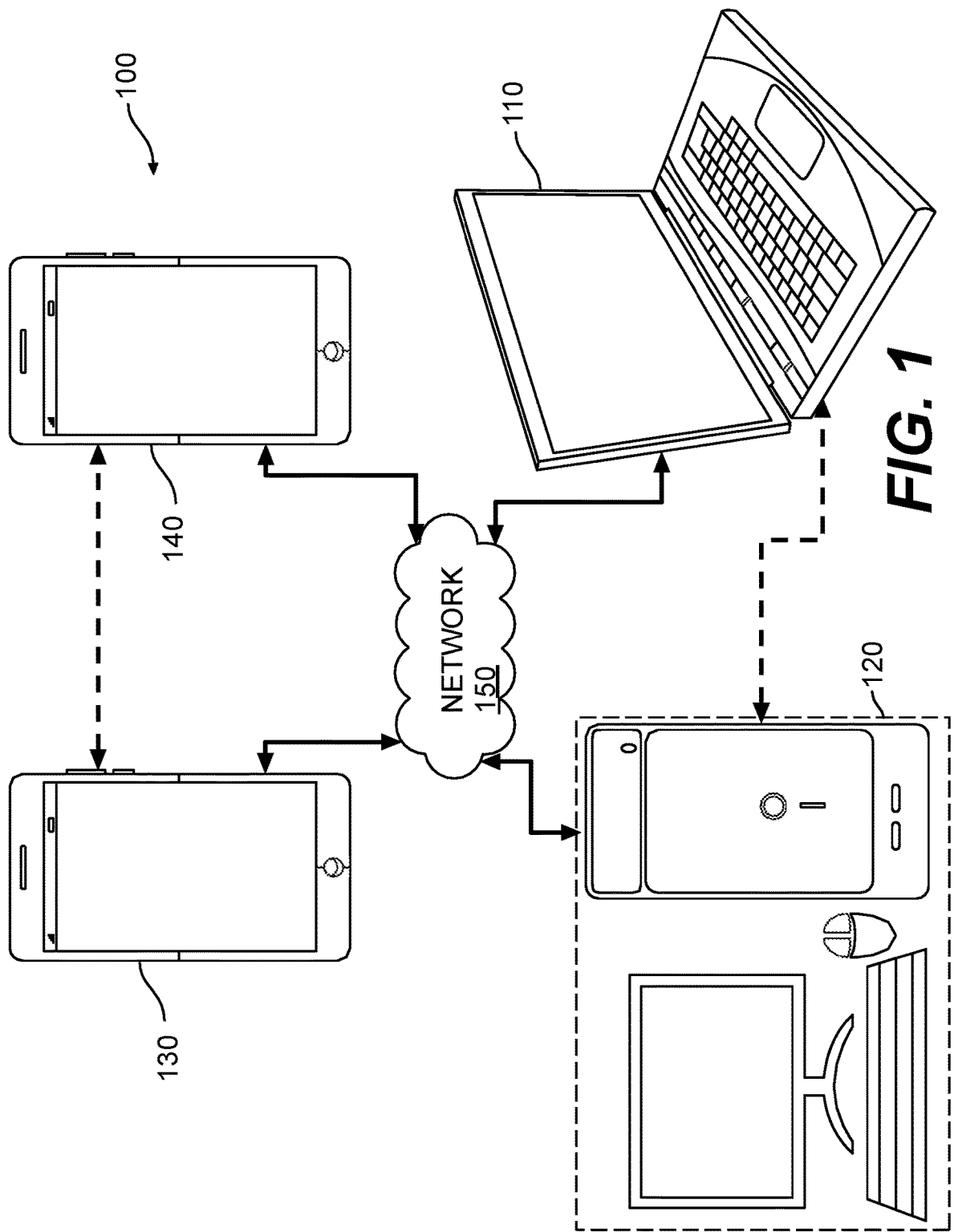
FIG. 1 shows a schematic illustration of a simplified block diagram of a communication system (100) in accordance with an example embodiment.

FIG. 1 illustrates a simplified block diagram of a communication system (100) according to an embodiment of the present disclosure. The communication system (100) includes a plurality of terminal devices, e.g., 110, 120, 130, and 140 that can communicate with each other, via, for example, a network (150). In the example of FIG. 1, the first pair of terminal devices (110) and (120) may perform unidirectional transmission of data. For example, the terminal device (110) may code video data in the form of one or more coded bitstreams (e.g., of a stream of video pictures that are captured by the terminal device (110)) for transmission via the network (150). The terminal device (120) may receive the coded video data from the network (150), decode the coded video data to recover the video pictures and display the video pictures according to the recovered video data. Unidirectional data transmission may be implemented in media serving applications and the like.

In another example, the second pair of terminal devices (130) and (140) may perform bidirectional transmission of coded video data, for example, during a videoconferencing application. For bidirectional transmission of data, in an example, each of the terminal devices (130) and (140) may code video data (e.g., of a stream of video pictures that are captured by the terminal device) for transmission to and may also receive coded video data from another of the terminal devices (130) and (140) to recover and display the video pictures.

In the example of FIG. 1, the terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
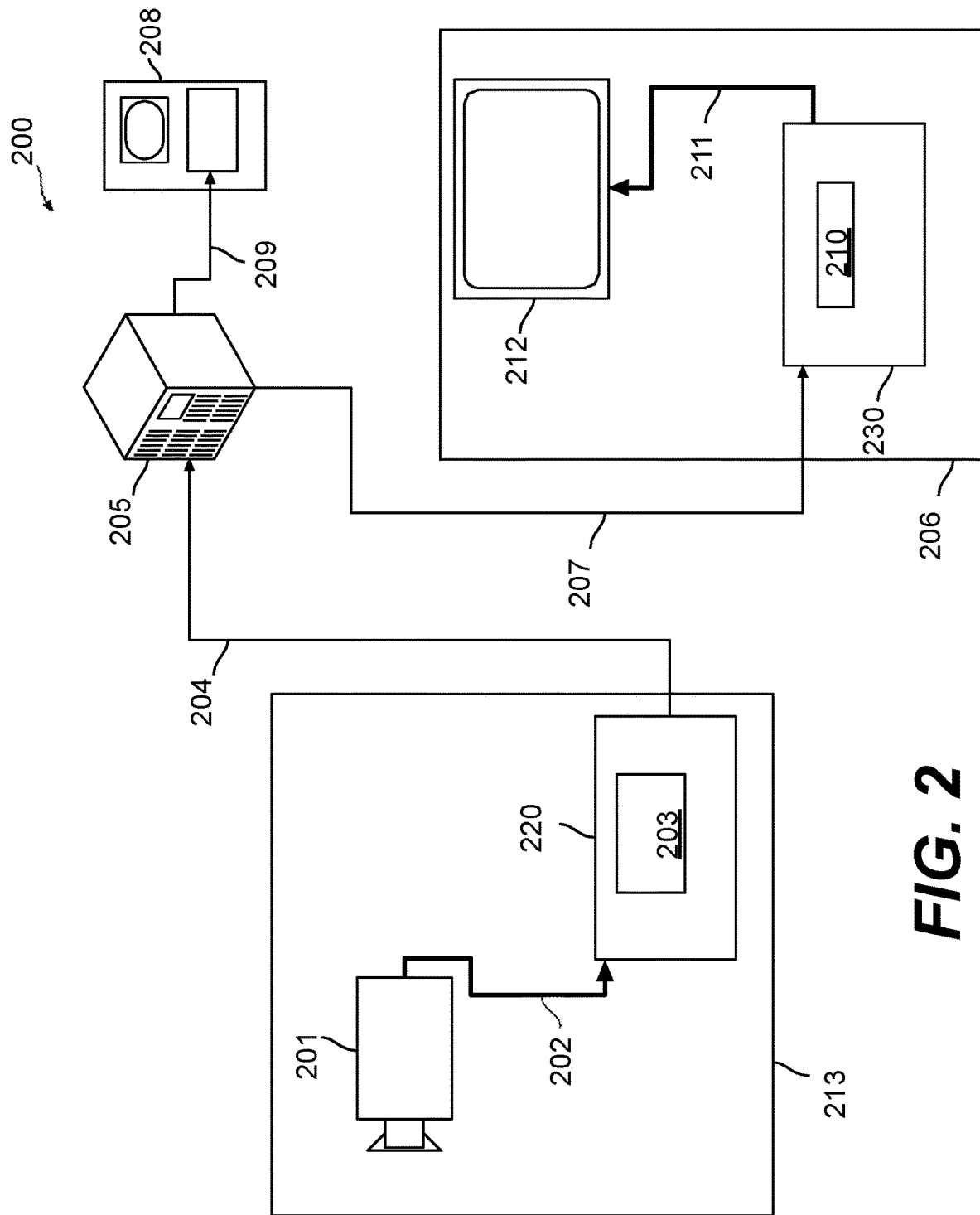
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source 201. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
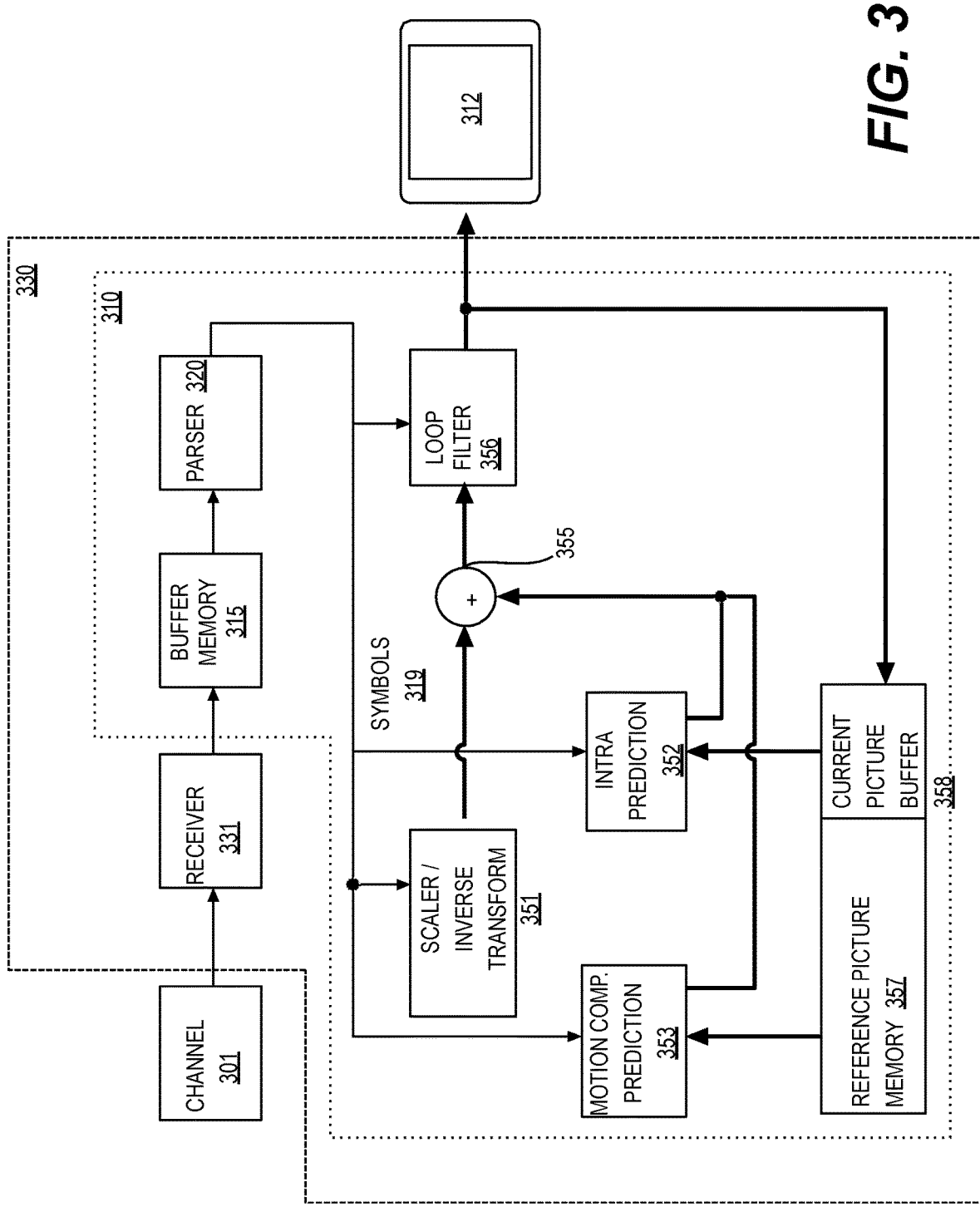
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
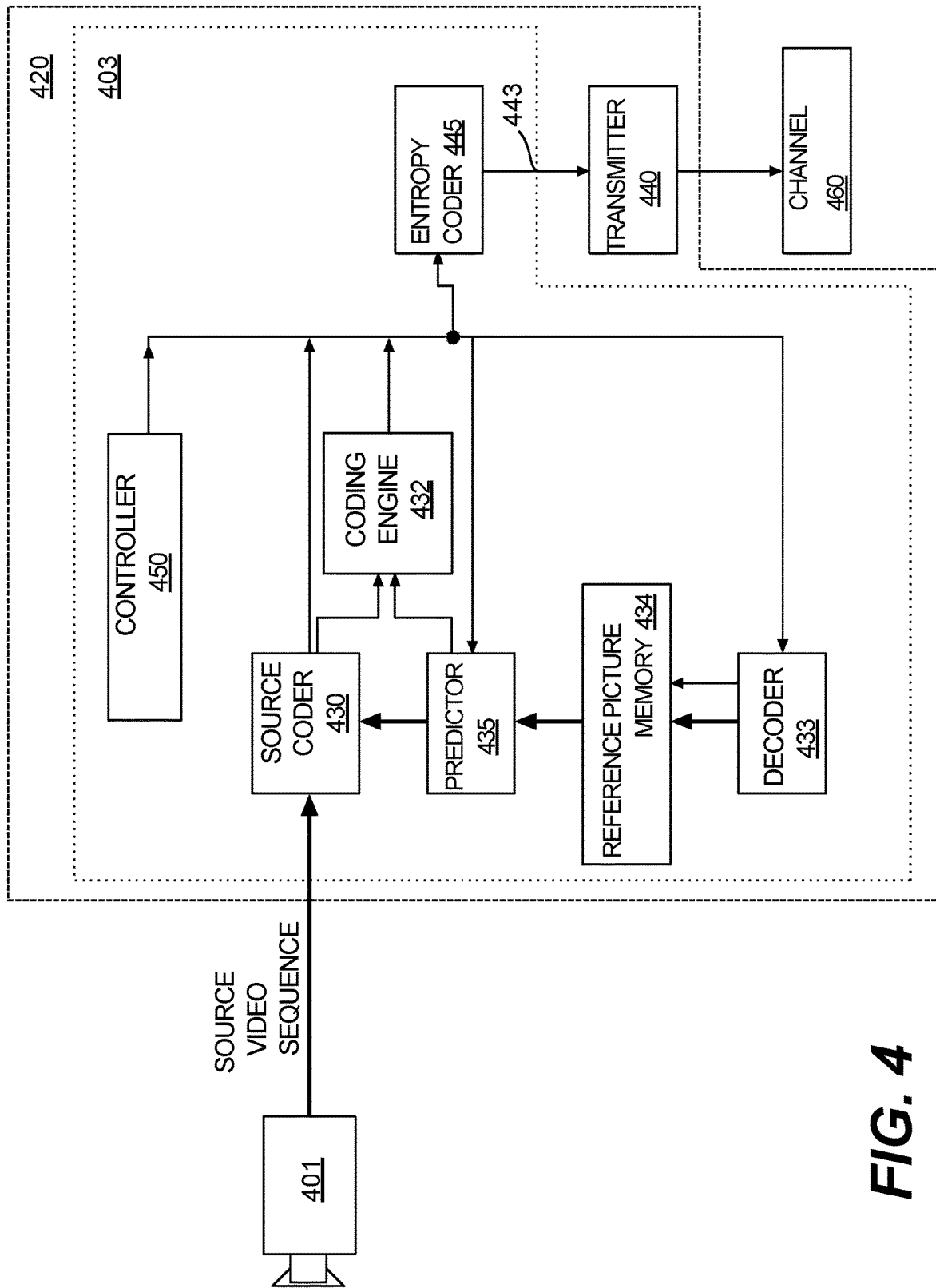
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive pictures. Source pictures commonly may be subdivided spatially into a plurality of sample coding blocks as described in further detail below.

Figure 5:
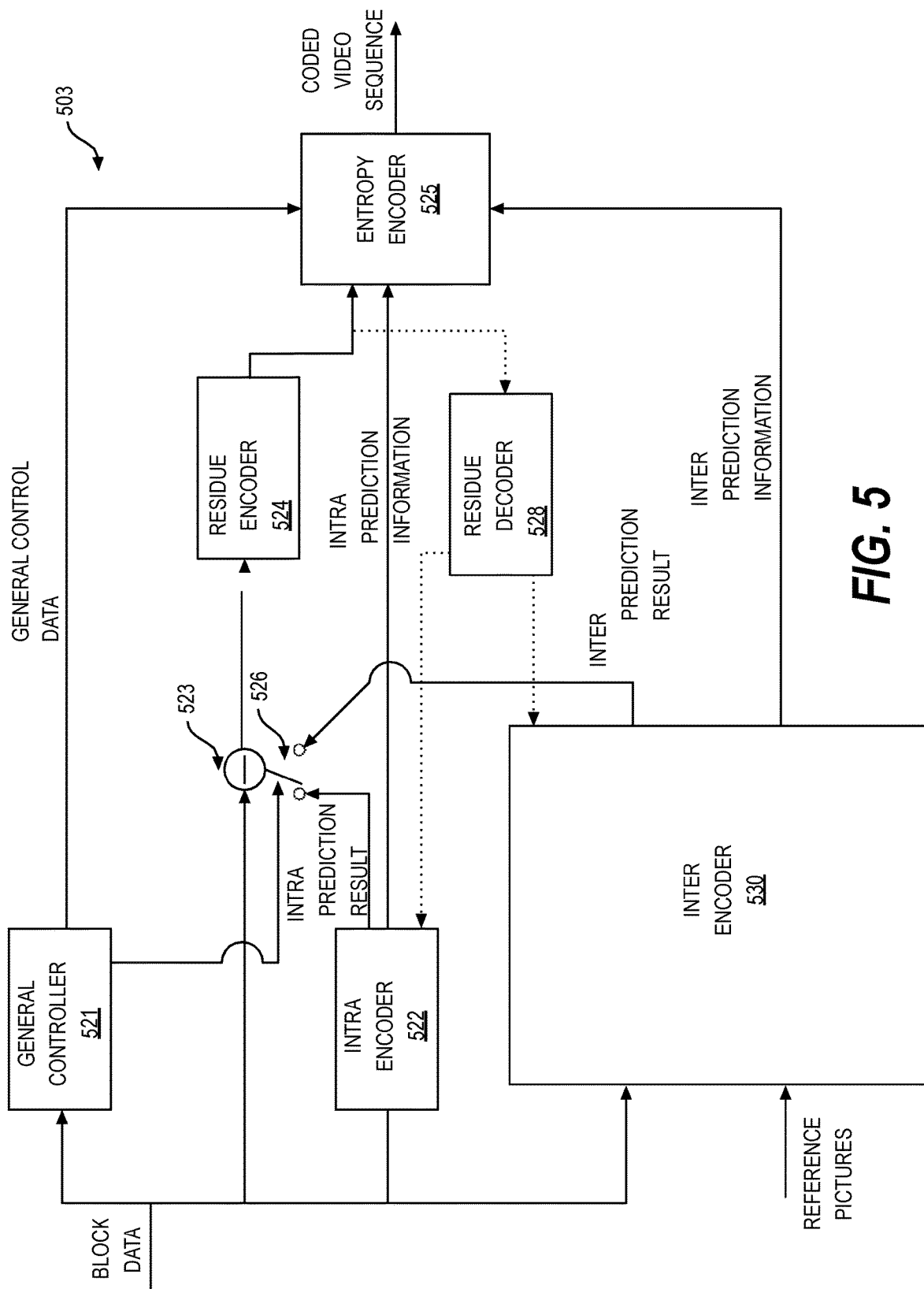
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
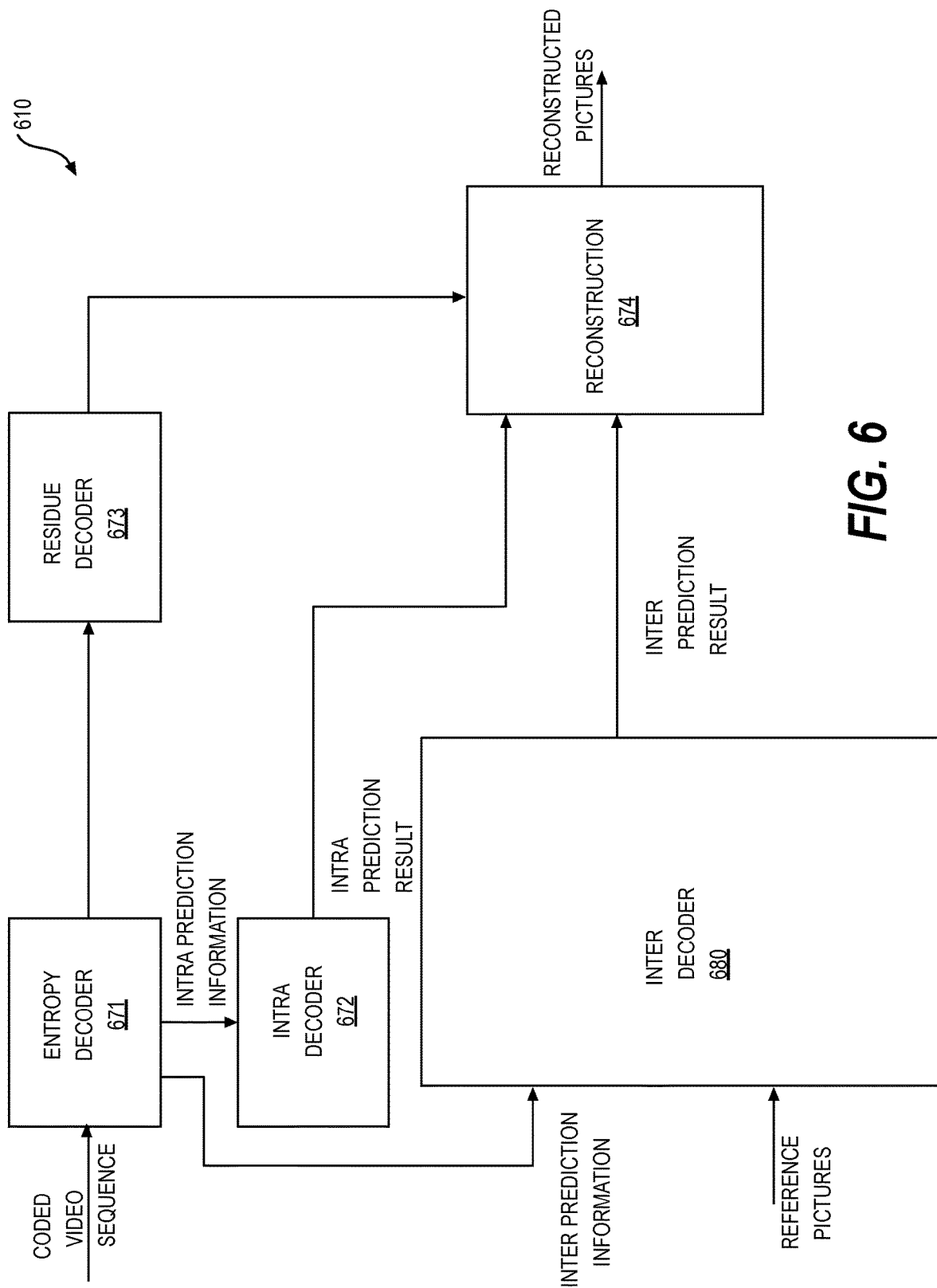
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT). The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBS by another coding partition tree structure.

A video block (a PB or a CB, also referred to as PB when not being further partitioned into multiple prediction blocks) may be predicted in various manners rather than being directly encoded, thereby utilizing various correlations and redundancies in the video data to improve compression efficiency. Correspondingly, such prediction may be performed in various modes. For example, a video block may be predicted via intra-prediction or inter-prediction. Particularly in an inter-prediction mode, a video block may be predicted by one or more other reference blocks or inter-predictor blocks from one or more other frames via either single-reference or compound-reference inter-prediction. For implementation of inter-prediction, a reference block may be specified by its frame identifier (temporal location of the reference block) and a motion vector indicating a spatial offset between the current block being encoded or decoded and the reference block (spatial location of the reference block). The reference frame identification and the motion vectors may be signaled in the bitstream. The motion vectors as spatial block offsets may be signaled directly, or may be itself predicted by another reference motion vector or predictor motion vector. For example, the current motion vector may be predicted by a reference motion vector (of e.g., a candidate neighboring block) directly or by a combination of reference motion vector and a motion vector difference (MVD) between the current motion vector and the reference motion vector. The latter may be referred to as merge mode with motion vector difference (MMVD). The reference motion vector may be identified in the bitstream as a pointer to, for example, a spatially neighboring block or a temporarily neighboring but spatially collocated block of the current block.

Returning to the intra prediction process, in which samples in a block (e.g., a luma or chroma prediction block, or coding block if not further split into prediction blocks) is predicted by samples of neighboring, next neighboring, or other line or lines, or the combination thereof, to generate a prediction block. The residual between the actual block being coded and the prediction block may then be processed via transform followed by quantization. Various intra prediction modes may be made available and parameters related to intra mode selection and other parameters may be signaled in the bitstream. The various intra prediction modes, for example, may pertain to line position or positions for predicting samples, directions along which prediction samples are selected from predicting line or lines, and other special intra prediction modes.

Figure 7:
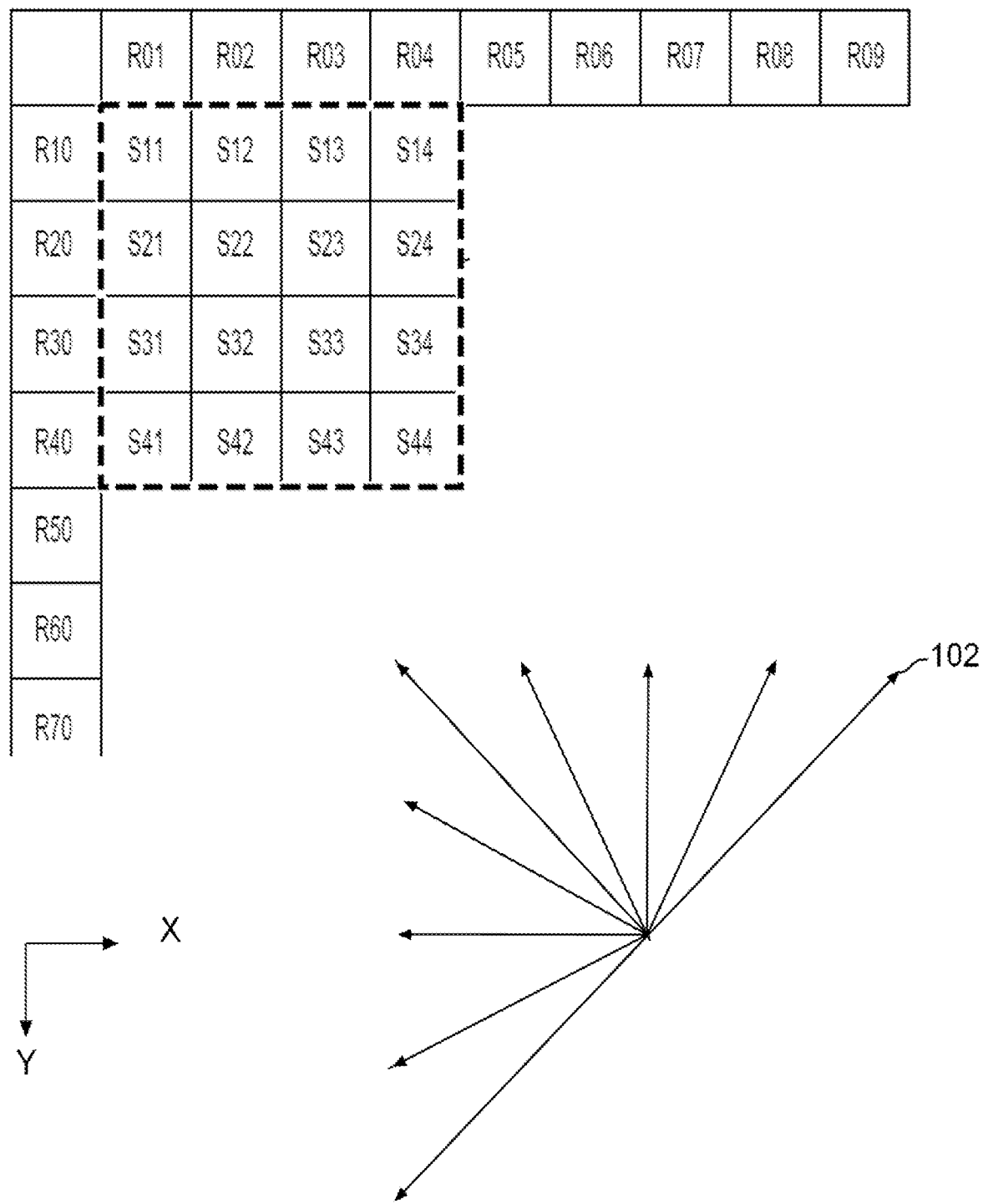
FIG. 7 shows a schematic illustration of an exemplary subset of intra prediction directional modes.

For example, a set of intra prediction modes (interchangeably referred to as "intra modes") may include a predefined number of directional intra prediction modes. As described in an example implementation of FIG. 7, these intra prediction modes may correspond to a predefined number of directions along which out-of-block samples are selected as prediction for samples being predicted in a particular block. In another particular example implementation, eight (8) main directional modes corresponding to angles from 45 to 207 degrees to the horizontal axis may be supported and predefined, as also shown in FIG. 7.

Figure 8:
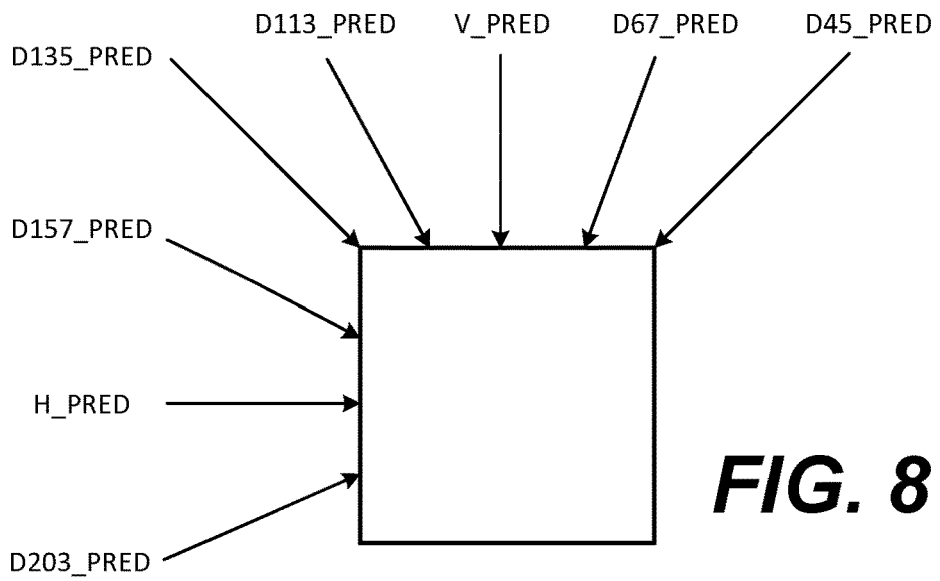
FIG. 8 shows nominal angles in directional intra-prediction.

In some other implementations of intra prediction, to further exploit more varieties of spatial redundancy in directional textures, directional intra modes may be further extended to an angle set with finer granularity. For example, the 8-angle implementation above may be configured to provide eight nominal angles, referred to as V_PRED, H_PRED, D45_PRED, D135_PRED, D113_PRED, D157_PRED, D203_PRED, and D67_PRED, as illustrated in FIG. 8, and for each nominal angle, a predefined number (e.g., 7) of finer angles may be added. With such an extension, a larger total number (e.g., 56 in this example) of directional angles may be available for intra prediction, corresponding to the same number of predefined directional intra modes. A prediction angle may be represented by a nominal intra angle plus an angle delta. For the particular example above with 7 finer angular directions for each nominal angle, the angle delta may be −3~3 multiplies a step size of 3 degrees.

Figure 9:
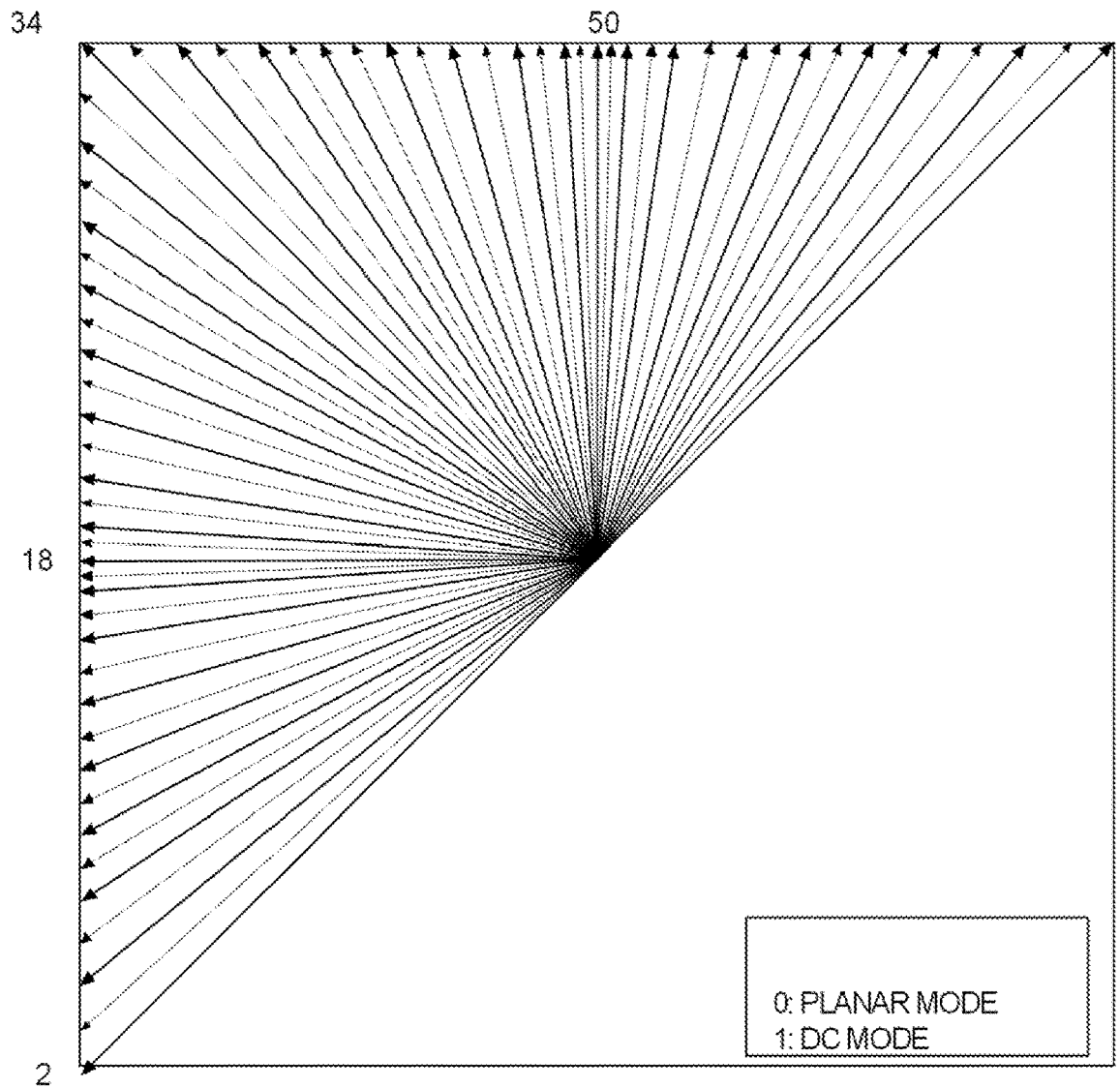
FIG. 9 shows an illustration of exemplary intra prediction directions.

As a further example, some other angular scheme for directional prediction may be used, as shown in FIG. 9 with 65 different prediction angles.

Figure 10:
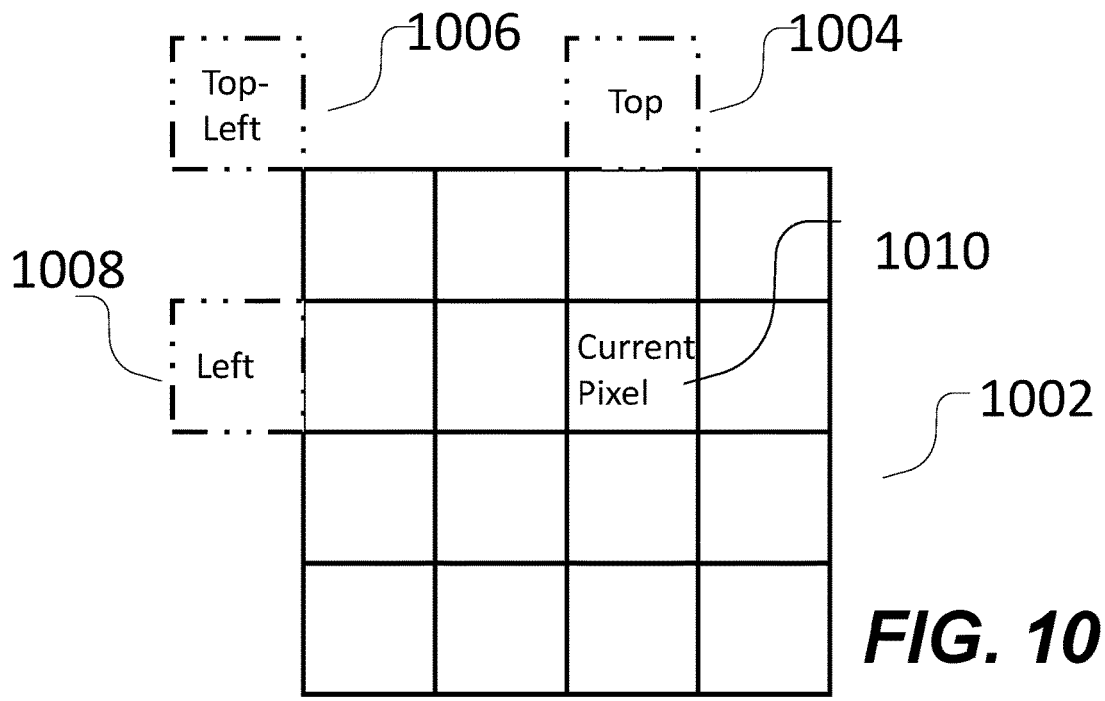
FIG. 10 shows top, left, and top-left position for PAETH mode for a coding block.

In some example implementations, alternative or in addition to the direction intra modes above, a predefined number of non-directional intra prediction modes may also be predefined and made available. For example, 5 non-direction intra modes referred to as smooth intra prediction modes may be specified. These non-directional intra mode prediction modes may be specifically referred to as DC, PAETH, SMOOTH, SMOOTH_V, and SMOOTH_H intra modes. Prediction of samples of a particular block under these example non-directional modes are illustrated in FIG. 10. As an example, FIG. 10 shows a 4×4 block 1002 being predicted by samples from a top neighboring line and/or left neighboring line. A particular sample 1010 in block 1002 may correspond to directly top sample 1004 of the sample 1010 in the top neighboring line of block 1002, a top-left sample 1006 of the sample 2011 as the intersection of the top and left neighboring lines, and a directly left sample 1008 of the sample 1010 in the left neighboring line of block 1002. For the example DC intra prediction mode, an average of the left and above neighboring samples 1008 and 1004 may be used as the predictor of the sample 1010. For the example PAETH intra prediction mode, the top, left, and top-left reference samples 1004, 1008, and 1006 may be fetched, and then whichever value among these three reference samples that is the closest to (top+left—topleft) may be set as the predictor for the sample 1010. For the example SMOOTH_V intra prediction mode, the sample 1010 may be predicted by a quadratic interpolation in vertical direction of the top-left neighboring sample 1006 and the left neighboring sample 1008. For the example SMOOTH_H intra prediction mode, the sample 1010 may be predicted by a quadratic interpolation in horizontal direction of the top-left neighboring sample 2006 and the top neighboring sample 1004. For the example SMOOTH intra prediction mode, the sample 1010 may be predicted by an average of the quadratic interpolations in the vertical and the horizontal directions. The non-directional intra mode implementations above are merely illustrated as a non-limiting example. Other neighboring lines, and other non-directional selection of samples, and other manners of combining predicting samples for predicting a particular sample in a prediction block are also contemplated.

Selection of a particular intra prediction mode by the encoder from the directional or non-directional modes above at various coding levels (picture, slice, block, unit, etc.) may be signaled in the bitstream. In some example implementations, the exemplary 8 nominal directional modes together with 5 non-angular smooth modes (a total of 13 options) may be signaled first. Then if the signaled mode is one of the 8 nominal angular intra modes, an index is further signaled to indicate the selected angle delta to the corresponding signaled nominal angle. In some other example implementations, all intra prediction modes may be indexed all together (e.g., 56 directional modes plus 5 non-directional modes to yield 61 intra prediction modes) for signaling.

In some example implementations, the example 56 or other number of directional intra prediction modes may be implemented with a unified directional predictor that projects each sample of a block to a reference sub-sample location and interpolates the reference sample by, for example, a 2-tap bilinear filter.

Figure 11:
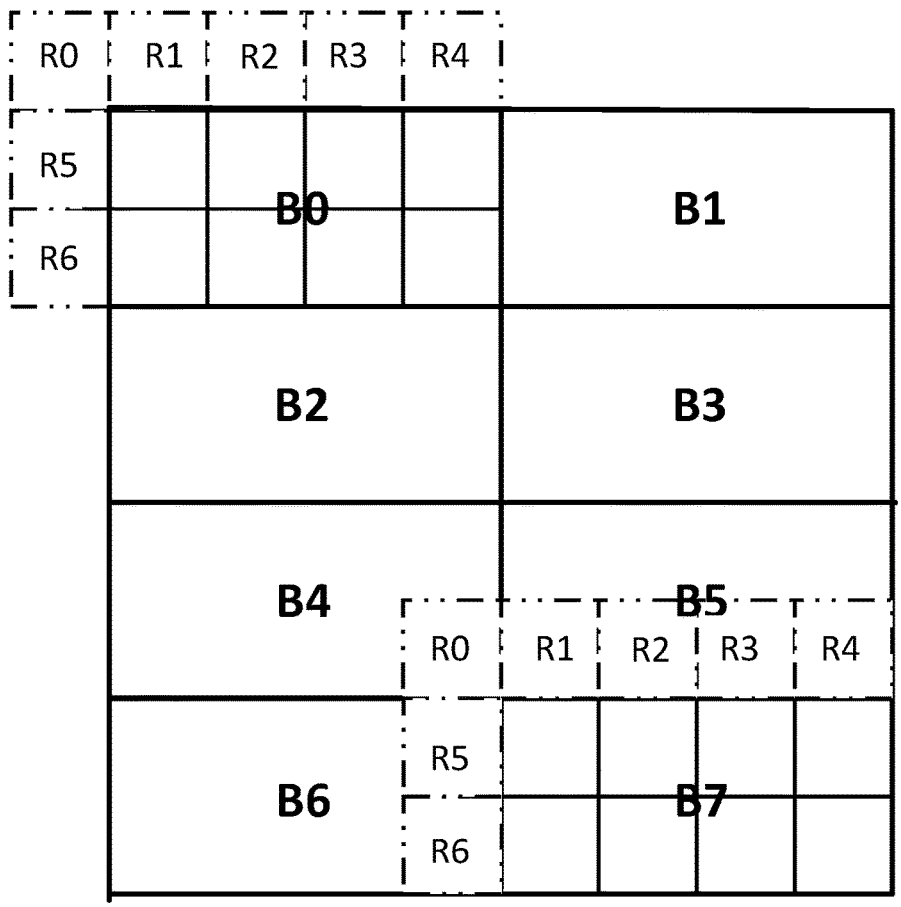
FIG. 11 shows example recursive intra filtering mode.

In some implementations, to capture decaying spatial correlation with references on the edges, additional filter modes referred to as FILTER INTRA modes may be designed. For these modes, predicted samples within the block in addition to out-of-block samples may be used as intra prediction reference samples for some patches within the block. These modes, for example, may be predefined and made available to intra prediction for at least luma blocks (or only luma blocks). A predefined number (e.g., five) of filter intra modes may be pre-designed, each represented by a set of n-tap filters (e.g., 7-tap filters) reflecting correlation between samples in, for example, a 4×2 patch and n=7 neighbors adjacent to it. In other words, the weighting factors for an n-tap filter may be position dependent. Taking an 8×8 block, 4×2 patch, and 7-tap filtering as an example, as shown in FIG. 11, the 8×8 block 2002 may be split into eight 4×2 patches. These patches are indicated by B0, B1, B1, B3, B4, B5, B6, and B7 in FIG. 11. For each patch, its 7 neighbors, indicated by R0~R6 in FIG. 11, may be used to predict the samples in a current patch. For patch B0, all the neighbor samples may have been already reconstructed and used for prediction of patch B0. But for other patches, some of the neighbor samples are in the current block and thus may not have been reconstructed, then their predicted values may be used as the reference. For example, all the 7 neighbor samples of patch B7 of the current block as indicated in FIG. 11 are not reconstructed yet, so the prediction samples of these neighbor samples are used instead.

The example intra-prediction implementations above, including directional intra prediction modes, the various non-directional modes, and the recursive filtering intra prediction mode, generally rely on linear prediction, relying on estimating or predicting a particular pixel based on linear operation of other intra reference samples, e.g., neighboring samples. In some circumstances, texture patterns in an image may be highly dynamic and may not necessarily present linear relationship among neighboring pixels. As such, intra prediction based on nonlinear relationship between neighboring samples may be designed in order to better capture such relationships and provide improved intra prediction coding gain, as described in further detail below.

The example methods/implementations/embodiments below may be used separately or combined in any order.

Further, each of the methods/implementations/embodiments, either a part or entirety of an encoder decoder may be implemented by processing circuitry (e.g., one or more processors or one or more integrated circuits). In one example, the one or more processors execute a program that may be stored in a non-transitory computer-readable medium. In the following, the term block may be interpreted as a prediction block, a coding block, or a coding unit, i.e., CU.

In some example implementations, the intra prediction samples may be derived using a predefined function using horizontal and vertical coordinate values and/or the surrounding sample values as inputs and the function parameters (or model parameters) may be derived using neighboring reconstruction samples or explicitly signaled. In other words, linear and/or nonlinear relationship among neighboring samples that reflects the texture information may be parameterized in a predefined model. Such a function may be alternatively referred to as a prediction function or prediction model. The term "predefined function" may be used to refer to a form of the function. In other words, the form of the prediction function may be predefined as shown by the examples below.

In this manner of intra prediction, because the predictor of a sample depends on its pixel coordinates within its coding block, it is in a sense analogous a warped inter prediction, where an affine model may be used to transform a block into a warped reference block such that the predictor sample in a reference frame for a sample being predicted in the current block depends on the pixel coordinates of the sample being predicted (due to spatial warping). Because of such pixel coordinate dependence of the predictor sample, the intra prediction above and as described in further detail below may be referred to as intra warping. The intra prediction mode for such manner of prediction may correspondingly be referred to as an intra warp mode. The intra warp mode may be considered as one additional intra prediction mode to other intra prediction modes described above, such as directional intra prediction modes, non-directional intra prediction modes, filter intra intra prediction modes, and the like. In some implementations, such a warp intra prediction mode may be in parallel with a non-warp intra prediction mode, under which these other intra prediction modes described above resides. Correspondingly, a signaling may be provided by the encoder in the bit stream to indicate to the decoder which of the multiple intra-prediction modes is being used at a particular coding level. Alternatively, a signaling may be provided by the encoder in the bit stream to indicate to the decoder whether a warp intra prediction mode is being used at a particular coding level, followed by additional signaling as to which on of other non-warp intra prediction modes is used for a particular coding level if it is not coded under the warp intra prediction mode.

In one example, the predefined prediction function may be a polynomial function with an order up to N.

In one example, the prediction function may be of the form $p(x, y) = a \cdot x^2 + b \cdot y^2 + c \cdot x \cdot y + d \cdot x + e \cdot y + f$, having model parameters a, b, c, d, e, and f, where (x, y) is the sample coordinate, e.g., relative to upper left corner of a block.

In one example, the prediction function may be of the form $p(x, y) = a \cdot x^2 + b \cdot y^2 + d \cdot x + e \cdot y + f$, having model parameters a, b, d, e, and f, where (x, y) is the sample coordinate.

In one example, the prediction function may be of the form:

$$p(x, y) = a \cdot x^2 + b \cdot y^2 + d \cdot x + e \cdot y + DC, \quad (1)$$

having model parameters a, b, d, and e, where (x, y) is the sample coordinate, and DC represents a DC prediction value derived from neighboring reconstruction samples.

In one example, the prediction function may be of the form:

$$p(x, y) = a \cdot x^2 + b \cdot y^2 + d \cdot x + e \cdot y + w_{TL} \cdot TL, \quad (2)$$

having model parameters a, b, d, e, and $w_{TL}$, where (x, y) is the sample coordinate, TL is the top left sample of the current block (TL is used in this example rather than DC above to avoid pipeline delay for calculating DC).

In one example, the prediction function may be of the form:

$$p(x, y) = a \cdot x^2 + b \cdot y^2 + d \cdot x + e \cdot y + w_T \cdot T + w_L \cdot L, \quad (3)$$

having model parameters a, b, d, e, $w_T$, and $w_L$ where (x, y) indicates the sample coordinate, T indicates the value of sample located at the top neighboring position for current pixel, and L indicates the value of sample located at the left neighboring position for current pixel.

In one example, the prediction function may be of the form:

$$p(x, y) = \\ a \cdot x^2 + b \cdot y^2 + d \cdot x + e \cdot y + w_T \cdot T + w_L \cdot L + w_{TR} \cdot TR + w_{BL} \cdot BL, \quad (4)$$

having model parameters a, b, d, e, $w_T$, $w_L$, $w_{TR}$ and $w_{BL}$, where (x, y) indicates the sample coordinate. T indicates the value of sample located at the top neighboring position for current pixel, L indicates the value of sample located at the left neighboring position for current pixel, TR indicates the value of sample located at the top-right neighboring position for current pixel, BL indicates the value of sample located at the bottom-left neighboring position for current pixel.

In the example above, the order of the example polynomials N above can be 1 (linear), 2 (order 2), 3, 4, . . . . Additional model parameters may be introduced.

In some other example implementations, rather than a polynomial function, the predefined prediction function may be in the form of a weighted sum of multiple trigonometric basis functions with up to N bases (each trigonometric function is referred to a basis function, or base). The trigonometric basis functions, or bases, for example, may be orthogonal to one another. Each of the trigonometric basis functions, again, may be a function of (x, y), the sample coordinate relative to, for example, upper-left corner of a block. The trigonometric basis functions, for example, may be a 2D trigonometric basis functions, or may be a combination of 2D trigonometric basis functions.

In one example, the bases may include the first N discrete cosine transform type 2 (DCT-2) bases. In one example, the bases may include the first N discrete sine transform type 7 (DST-7) bases. In one example, the bases may be from any of DCT type 1-8 and DST type 1-8 bases.

In some other example implementations, the predefined prediction function may be in the form of a weighted sum of multiple Karhunen Loeve Transform (KLT) bases with up to N KLT bases. The KLT bases, for example, may be the eigen vectors of a covariance matrix derived from neighboring reconstruction samples. The KLT bases, for example, may be predefined eigen vectors that are known to both encoder and decoder. Each of the KLT bases, again, may be a function of (x, y), the sample coordinate relative to, for example, upper-left corner of a block.

In some other example implementations, the predefined prediction function may be in the form of a mixture of polynomial functions and trigonometric functions above and number of terms with corresponding model parameters may be predefined.

The various model parameters above may be predefined or signaled. In some example implementations, the model parameters may be predefined as indexed sets. The choice of sets of a particular block, or the index, for example, may be made by the encoder in real time, and at various level (picture, frame, slice, macroblock, block, etc.) and signaled into the bitstream. In some example implementations, the model parameters may be derived by the encoder in real time and signaled in the bitstream at various levels.

In some example implementations, the model parameters used in a predefined prediction function may be clipped to a predefined range (so as to limit a number of bits to represent the values of these parameters). Model parameters with clipped range may help reduce computation burden. In addition, in the situation where the model parameters are signaled, clipping of parameter value range may further help reduce the number bits for signaling the parameters. In some implementations, the range(s) for parameter values may be signaled rather than predefined.

In some example implementations, the prediction values generated by the predefined prediction function may be clipped to a predefined range in order to reduce computation burden in an encoder and/or decoder.

In the example implementations above, the clipped minimum value and maximum value of the predictive value of the predefined function may depend an internal bit depth range. For example, if the internal bit depth is 8 (or 10) for computation purposes, the minimum and maximum range may be from 0 (0) to 255 (1023). In some example implementations, the clipped minimum value and maximum value or range may be signaled in high-level syntax.

In some example implementations, the model parameters used in the predefined prediction function may be quantized to specific precision, such as 1 (integer), ½, ¼, ⅛, 1/16, 1/32, 1/64, 1/128, 1/256.

In some example implementations, different model parameters for the predefined prediction function may be quantized differently. For example, with the example prediction function in Equation (1) above, parameters a, b and c may be quantized to 1/16 precision, parameters d, e and f may be quantized to ¼ precision. As such, this prediction function may be implemented as $p(x, y)=(a \cdot x^2+b \cdot y^2+c \cdot x \cdot y+8)>>4+(d \cdot x+e \cdot y+f+2)>>2$, where model parameters a, b, c, d, e and f are all integers represented shifted version (magnified) of these parameters according to their precisions.

In some example implementations, the weighted terms in the prediction functions above (such as $a \cdot x^2$ or $b \cdot y^2$) associated with a same precision may be calculated together and rounded together.

In some example implementations, the precisions for the model parameters may be signaled in high-level syntax and at various levels. The set of precisions available may be predefined and selection of the precision for a parameter or a group of parameters may be signaled by index in the set of the predefined available precisions.

In some example implementations, the coefficients of the abovementioned functions may be derived both at the encoder and decoder side according to a predefined or signaled algorithm or optimization procedure. The derivation may be based on using single line or multiple lines template at above and left of the current block, which contains reconstructed samples. The template, which represent selection samples for the derivation of optimization may be predefined or may be signaled. For example, a set of templates may be predefined and the template to be sued may be signaled by index within the set of templates at various coding levels in the bitstream.

In some example implementations, the current block can be divided into multiple subblocks (with pixel width/height larger than or equal to a predetermined value, e.g., 2) and the model parameter or coefficients above may be computed/derived for each subblock using the available surrounding information of a current subblock.

In some example implementations, the coefficients of the abovementioned model prediction functions may be explicitly signaled in the bitstream, and parsed at the decoder side to perform the reconstruction.

Figure 12:
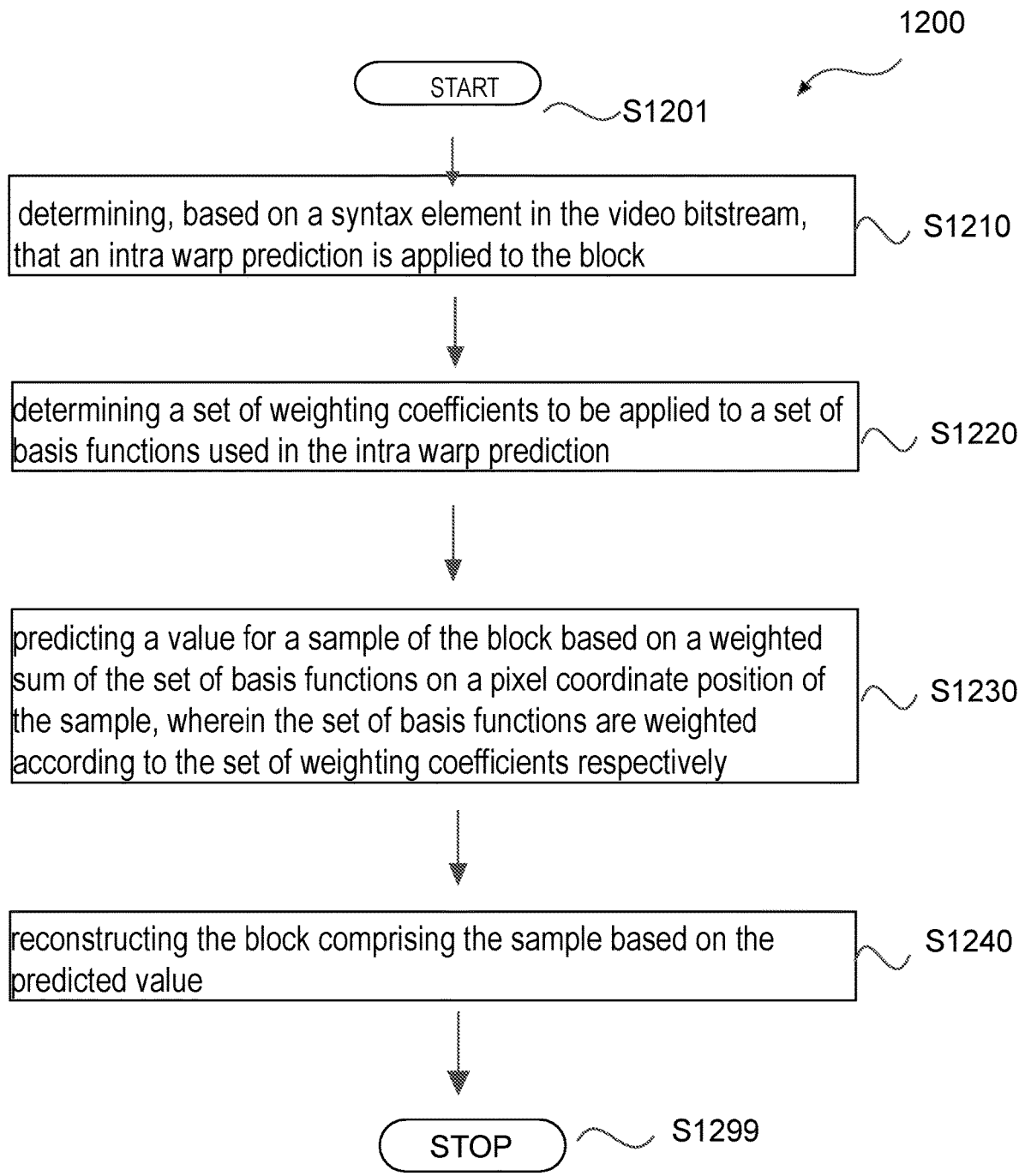
FIG. 12 shows a flow chart for performing an example intra prediction under an intra warp mode.

FIG. 12 shows a flow chart of an example method 1200 for decoding a block in a video stream. The method 1200 starts at S1201. In Step S1210, it is determined, based on a syntax element in the video bitstream, that an intra warp prediction is applied to the block. In Step 1220, a set of weighting coefficients to be applied to a set of basis functions used in the intra warp prediction are determined. In Step S1230, a value for a sample of the block is predicted based on a weighted sum of the set of basis functions on a pixel coordinate position of the sample, wherein the set of basis functions are weighted according to the set of weighting coefficients respectively. In step S1240, the block comprising the sample is reconstructed based on the predicted value. The method flow 1200 ends at S1299.

Operations above may be combined or arranged in any amount or order, as desired. Two or more of the steps and/or operations may be performed in parallel. Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block. In the following items, when saying block size, it may refer to either the block width or height, or maximum value of width and height, or minimum of width and height, or area size (width*height), or aspect ratio (width:height, or height:width) of the block.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
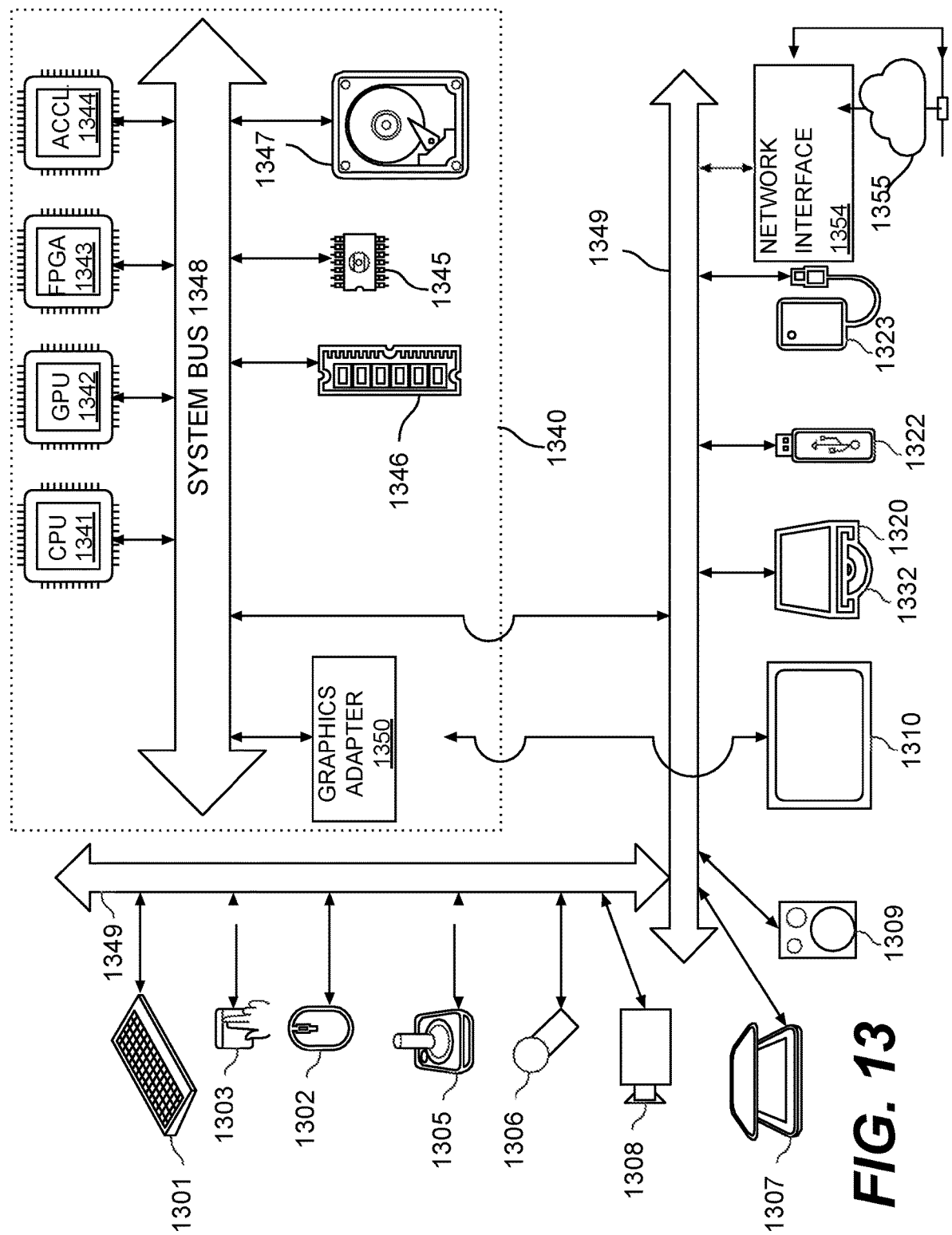
FIG. 13 shows a schematic illustration of a computer system in accordance with example embodiments of the disclosure.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a block in a video bitstream, the method comprising:
   determining, based on a syntax element in the video bitstream, that an intra warp prediction is applied to the block;
   determining a set of weighting coefficients to be applied to a set of basis functions used in the intra warp prediction;
   predicting a value for a sample of the block based on a weighted sum of the set of basis functions on a pixel coordinate position of the sample, wherein the set of basis functions are weighted according to the set of weighting coefficients respectively; and
   reconstructing the block comprising the sample based on the predicted value.

2. The method of claim 1, wherein:
   the set of basis functions comprise power functions of the pixel coordinate position of the sample up to an order of N, N being an integer; and
   the weighted sum of the basis functions comprises a polynomial of the pixel coordinate position of the sample of up to the order of N.

3. The method of claim 2, wherein N=2 and the set of weighting coefficients comprise:
   6 coefficients for two-dimensional polynomial terms of horizontal and vertical pixel coordinates of the sample;
   5 coefficients for two-dimensional polynomial terms of horizontal and vertical pixel coordinates of the sample except one cross term; or
   4 coefficients for two-dimensional polynomial terms dependent on horizontal and vertical pixel coordinates of the sample except one cross term, and further comprise at least one coordinate-independent term.

4. The method of claim 3, wherein the at least one coordinate-independent term comprises an offset term comprising a DC value derived from reconstructed neighbors of the sample.

5. The method of claim 3, wherein:
the set of weighting coefficients further comprise an offset coefficient and the at least one coordinate-independent term comprises an offset term being a product of the offset coefficient and a reconstructed value of a top-left corner sample of the block; or
the set of weighting coefficients further comprise a first offset coefficient and a second offset coefficient, and the at least one coordinate-independent term comprises a first offset term and a second offset term, the first offset term being a product of the first offset coefficient and a top reconstructed neighbor of the sample, and the second offset term being a product of the second offset coefficient and a left reconstructed neighbor of the sample; or
the set of weighting coefficients further comprise a first, second, third, and fourth offset coefficients, and the at least one coordinate-independent term comprises a first, second, third, and fourth offset terms, the first offset term being a product of the first offset coefficient and a top reconstructed neighbor of the sample, the second offset term being a product of the second offset coefficient and a left reconstructed neighbor of the sample, the third offset term being a product the third offset coefficient and a top-right reconstructed neighbor of the sample, and the fourth offset term being a product of the fourth offset coefficient and a bottom left reconstructed neighbor of the sample.

6. The method of claim 2, wherein N=2 and the weighted sum of the basis functions comprises:

$$p(x, y) = a \cdot x^2 + b \cdot y^2 + c \cdot x \cdot y + d \cdot x + e \cdot y + f; \text{ or}$$
$$p(x, y) = a \cdot x^2 + b \cdot y^2 + d \cdot x + e \cdot y + f,$$

where a, b, c, d, e, and f represent polynomial coefficients, (x, y) represents the sample coordinate, and p(x, y) represents the weighted sum.

7. The method of claim 1, wherein the set of basis functions comprise up to N trigonometric basis functions of the pixel coordinate position of the sample, where N is an integer and wherein the N trigonometric basis functions comprise:
first N type-2 discrete cosine transform bases;
first N type-7 discrete sine transform bases; or
any N type 1 through 8 discrete sine transform bases and type 1 through 8 discrete cosine transform bases.

8. The method of claim 1, wherein the set of basis functions comprise up to N Karhunen Lòeve Transform (KLT) bases as function of the pixel coordinate position of the sample, N being an integer.

9. The method of claim 8, wherein the N KLT bases comprise eigen vectors of a covariance matrix derived from reconstructed neighbors of the sample or are predefined eigen vectors known to both an encoder and a decoder.

10. The method of claim 1, wherein the set of basis functions comprise a subset of power functions and a subset of trigonometric functions of the pixel coordinate position of the sample.

11. The method of claim 1, further comprising parsing the video bitstream to determine the set of weighting coefficients signaled in the video bitstream.

12. The method of claim 11, wherein the set of weighting coefficients are derived by an encoder using multiple-line template at above and left of the block.

13. The method of claim 1, wherein parsing the video bitstream to determine the weighting coefficients comprise:
parsing the video bitstream to obtain an index for the set of weighting coefficients from the video bitstream; and
identifying the set of weighting confidents among a plurality of sets of weighting coefficients according to the index.

14. The method of claim 1, wherein the set of weighting confidents are clipped to a predefined value range.

15. The method of claim 1, wherein the prediction value of the sample is clipped to a predefined value range and wherein a clipped minimum value and a clipped maximum value of the prediction value are determined by an internal bit depth range.

16. The method of claim 1, wherein the set of weighting coefficients are quantized according to one or more predefined precisions.

17. The method of claim 16, wherein at least two of the set of weighting coefficients are quantized to different precisions.

18. The method of claim 16, wherein terms in the weighted sum of the set of basis functions associated with a same precision are calculated and rounded together.

19. The method of claim 16, wherein precisions for the set of weighting coefficients are signaled in high-level syntax in the video bitstream.

20. An electronic device comprising a memory for storing instructions and a processor for executing the instructions to:
determine, based on a syntax element in a video stream, that an intra warp prediction is applied to a block in the video stream;
determine a set of weighting coefficients to be applied to the set of basis functions used in the intra warp prediction;
predict a value for a sample of the block based on a weighted sum of the set of basis functions on a pixel coordinate position of the sample, wherein the set of basis functions are weighted according to the set of weighting coefficients respectively; and
reconstruct the block comprising the sample based on the predicted value.

* * * * *